United States Patent

[11] 3,572,743

| [72] | Inventor | Edward L. Parr |
| | | 301 N. Cuyamaca, El Cajon, Calif. 92020 |
| [21] | Appl. No. | 870,004 |
| [22] | Filed | Oct. 20, 1969 |
| [45] | Patented | Mar. 30, 1971 |
| | | Continuation-in-part of application Ser. No. 679,032, Oct. 30, 1967, now abandoned. |

[54] WHEELED VEHICLE FOR MOVING BOATS OR THE LIKE
12 Claims, 19 Drawing Figs.

[52] U.S. Cl. .................................................. 280/42,
214/390, 280/43.23, 280/414
[51] Int. Cl. ............................................... B60p 3/10
[50] Field of Search ........................................ 280/34 (1),
134, 38, 39, 40, 42, 43.17, 43.23, 414, 414 (A);
214/390, 396

[56] References Cited
UNITED STATES PATENTS

| 2,227,762 | 1/1941 | Ronning | 280/414UX |
| 2,608,418 | 8/1952 | Finlayson et al. | 280/42 |
| 2,613,083 | 10/1952 | Moludy | 280/42 |
| 2,788,908 | 4/1957 | Lynd | 280/414X |
| 2,822,100 | 2/1958 | Pesta | 214/396 |
| 2,938,735 | 5/1960 | Bennett | 280/34(.1) |
| 3,103,371 | 9/1963 | Young | 280/414 |
| 3,131,902 | 5/1964 | Zak, Jr. | 280/414X |
| 3,175,710 | 3/1965 | Kistner | 280/414UX |
| 3,356,239 | 12/1967 | Klein | 214/390 |
| 3,442,409 | 5/1969 | Larson | 280/423X |

Primary Examiner—Benjamin Hersh
Assistant Examiner—Leslie J. Papernor
Attorney—Warren H. F. Schmieding

ABSTRACT: A wheeled vehicle for moving boats or the like, which vehicle includes a forklike frame, i.e. it includes two rearwardly extending and laterally disposed prongs. Each prong carries a bearing for a lever which is supported by a ground wheel. The bearings for the levers can be raised and lowered relative to the wheels to raise and lower the prongs with the boat thereon. The area between the prongs is unobstructed.

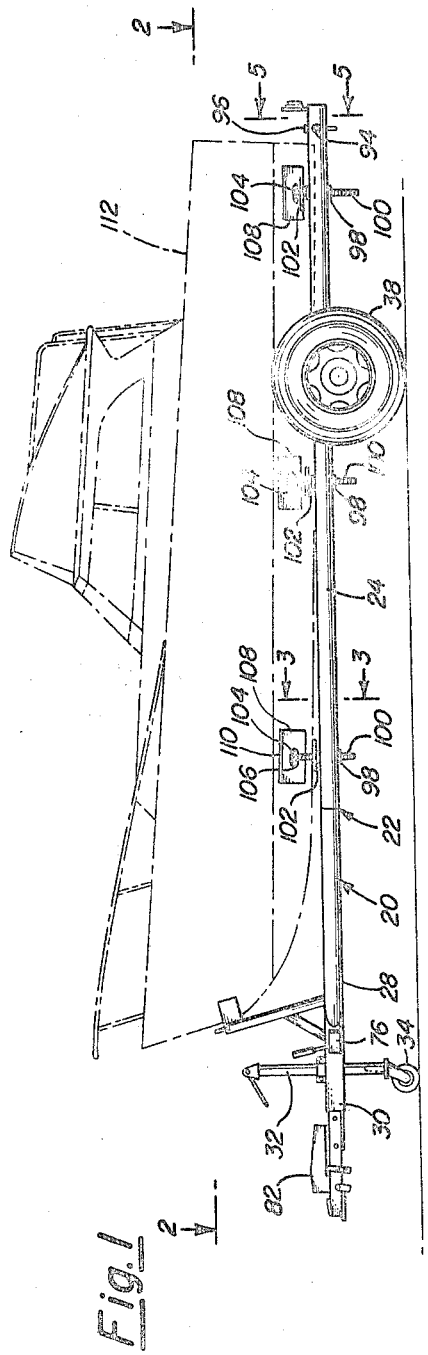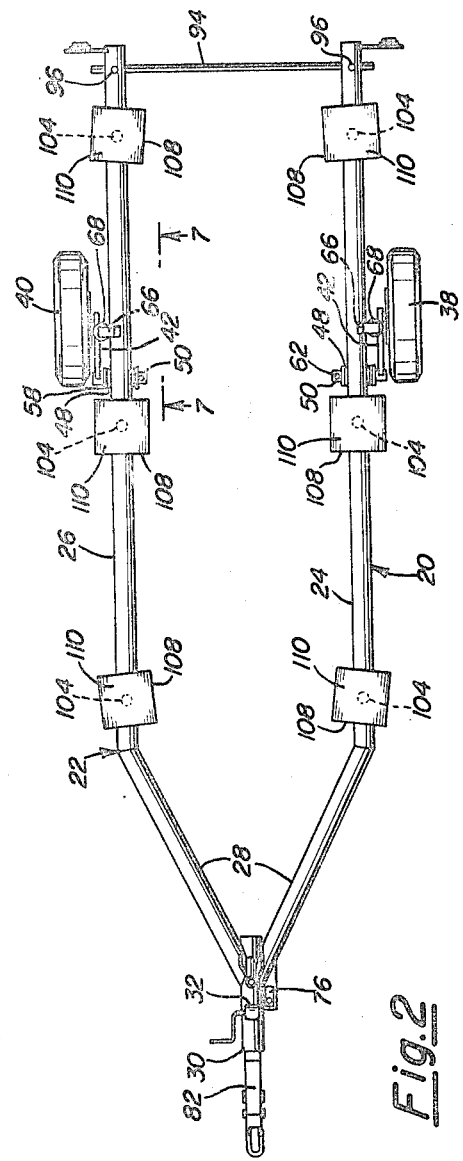

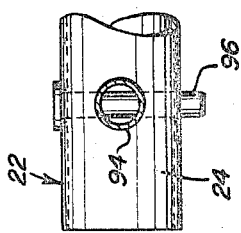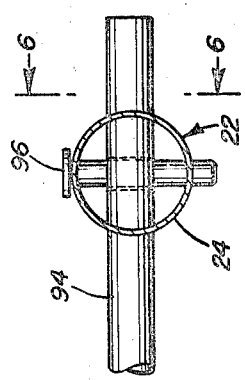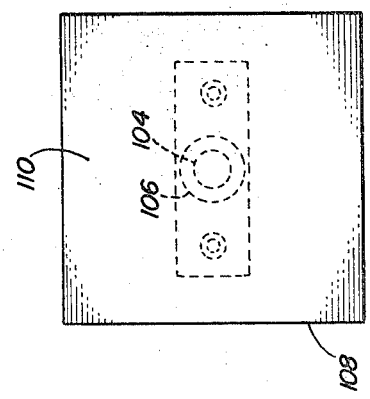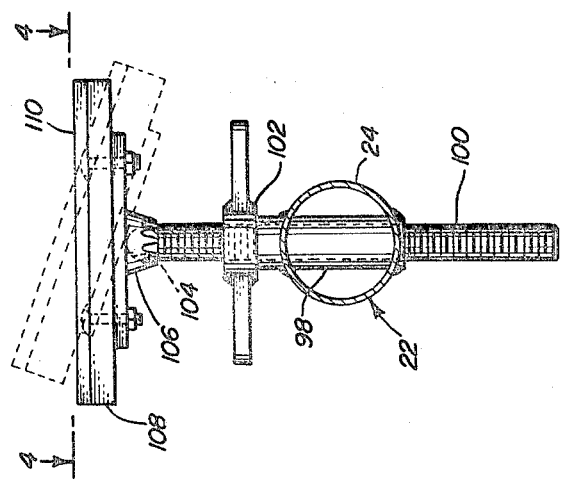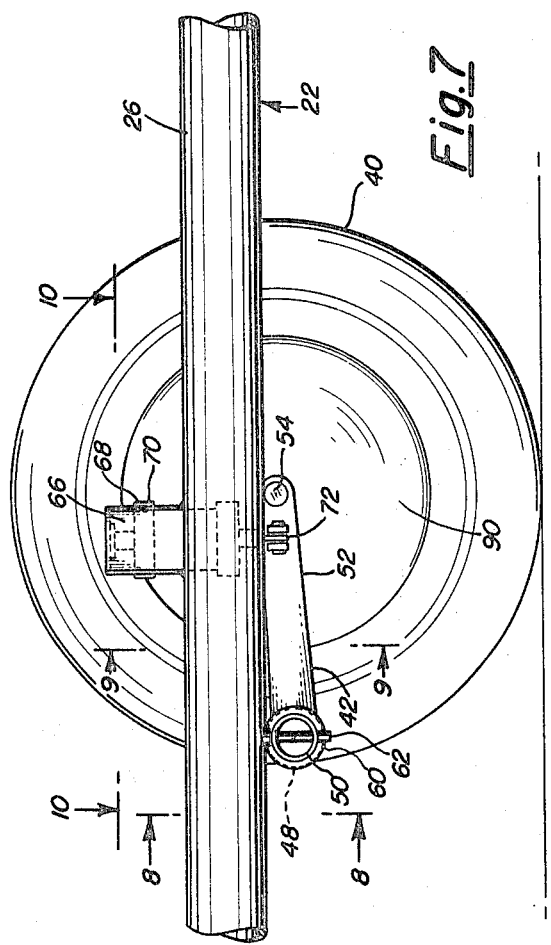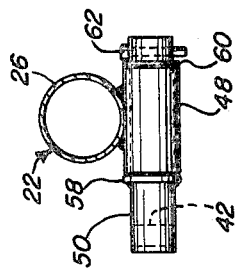
INVENTOR.
EDWARD L. PARR

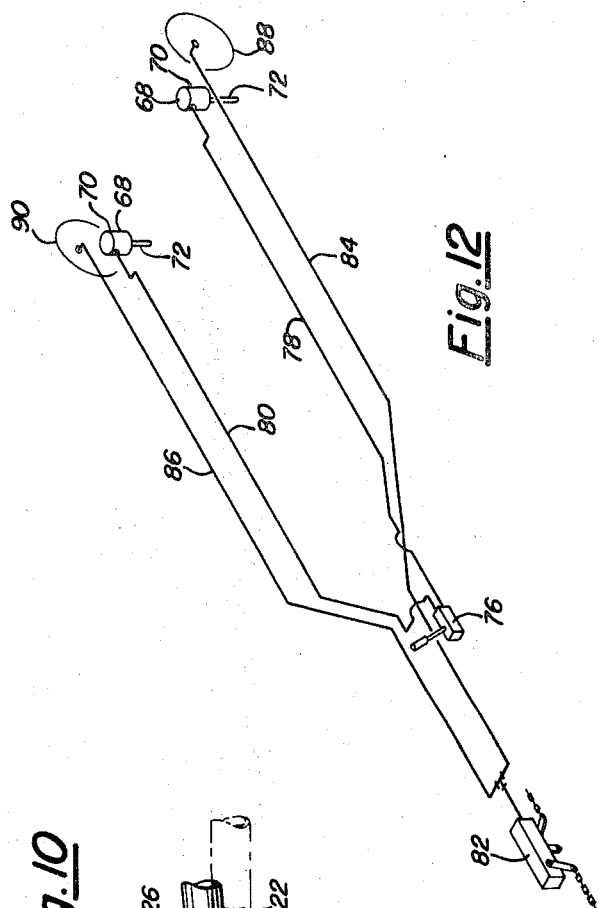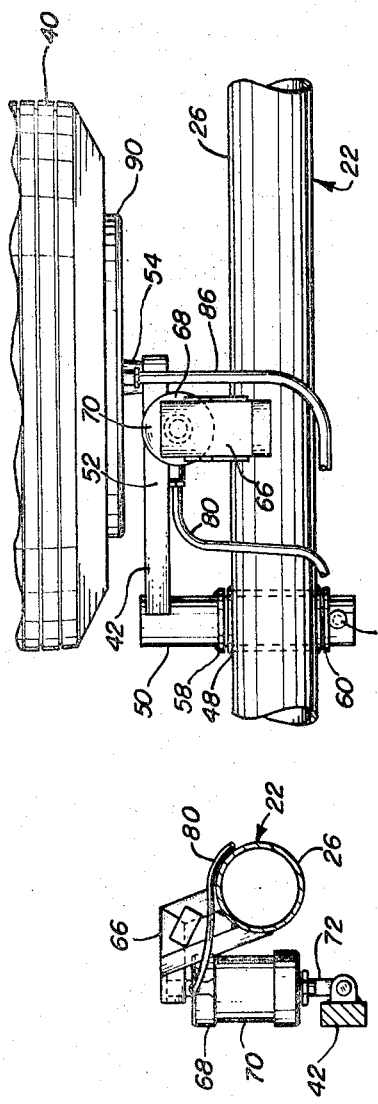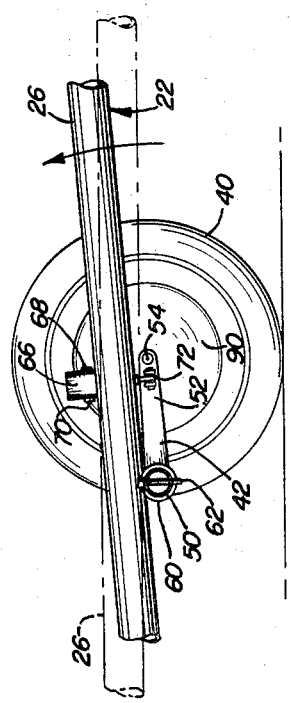

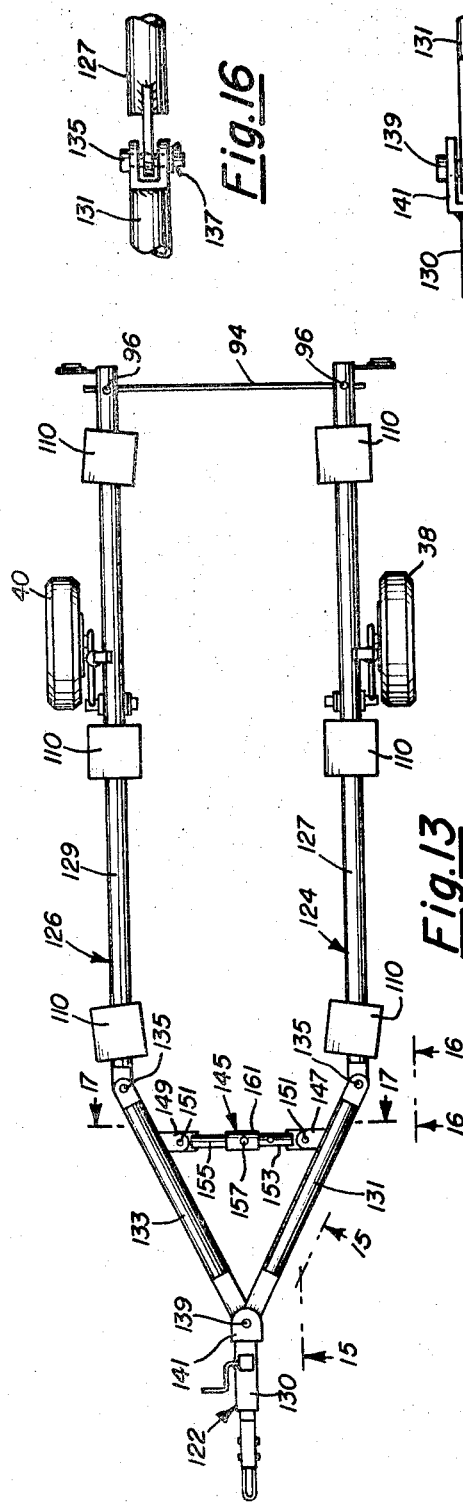

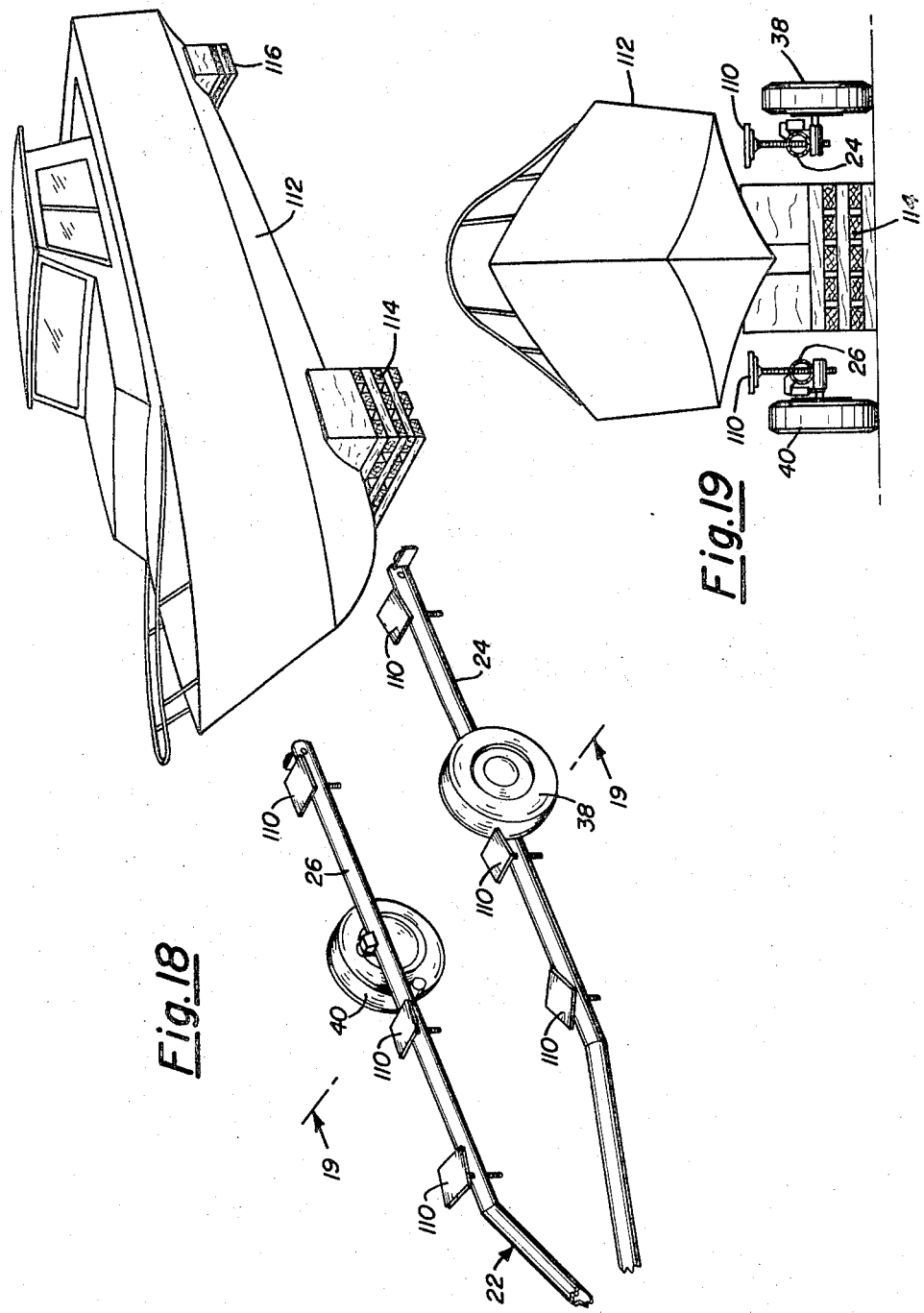

WHEELED VEHICLE FOR MOVING BOATS OR THE LIKE

CROSS-REFERENCE TO RELATED APPLICATION

This application is a continuation-in-part of my copending application Ser. No. 679,032, filed Oct. 30, 1967 and now abandoned.

BACKGROUND OF THE INVENTION

1. Field of the Invention

The invention is directed to vehicles employed for moving, docking and launching boats or the like.

2. Description of the Prior Art

The prior art is best illustrated in the patents to La Roque, U.S. Pat. No. 3,257,125 issued Jun. 21, 1966 and to Eckroad, U.S. Pat. No. 2,754,129 issued Jul. 10, 1956. However, in those disclosures, the frames include, in addition to rearwardly extending frame members, cross-frame members. If an attempt were made to pick up a docked boat with either of the frames of those patents, the cross-frame members would engage the dock and either be stopped by the dock or would destroy the dock and cause injury to the boat.

SUMMARY OF THE INVENTION

The area between the prongs is unobstructed whereby upon backing the vehicle, the prongs of the vehicle frame will straddle the dock which supports the boat. Then when the prongs of the frame are raised, they lift the boat off the dock. Likewise, when docking the boat, the frame with the boat thereon is moved to a position in which the boat overlies the dock, the prongs straddling the dock. Then upon lowering the prongs, the boat will rest upon the dock. Thereafter, the frame is moved forwardly.

Also, the vehicle is used for removing a floating boat from the water by backing the vehicle to a position in which the prongs extend below the boat. Then upon raising the prongs, the boat is lifted out of the water. Too, the vehicle is used for launching the boat after it has been picked up by the prongs. This is accomplished by backing the vehicle into the water and then lowering the prongs.

Other features and the advantages of the present invention will be apparent from the following description, reference being made to the accompanying drawings wherein preferred embodiments of the invention are illustrated.

BRIEF DESCRIPTION OF THE DRAWINGS

FIG. 1 is a left side view of one embodiment of an improved vehicle of the type for supporting, for example, a boat, the boat being shown in phantom;

FIG. 2 is a top plan view of the vehicle;

FIG. 3 is a fragmentary sectional view taken along lines 3-3 of FIG. 2, but on a larger scale and showing the supporting pad in tilted position in dotted lines and in nontilted position in full lines;

FIG. 4 is a top plan view of the pad, i.e., looking in the direction of arrows 4 in FIG. 3;

FIG. 5 is a fragmentary sectional view taken along lines 5-5 of FIG 1, but on a larger scale, the view showing the rear tie bar attached to the prongs of the frame;

FIG. 6 is a fragmentary view, partly in section, the section being taken along line 6-6 of FIG. 5;

FIG. 7 is a fragmentary view looking in the direction of arrows 7 of FIG. 2, but on a larger scale;

FIGS. 8, 9 and 10 are fragmentary views, partly in section, the section being taken along lines 8-8, 9-9 and 10-10 of FIG. 7;

FIG. 11 is a view similar to FIG. 7, but on a smaller scale, and showing the position of the rear end of the frame after it has been lowered while the front end of the frame is still in elevated position.

FIG. 12 is a diagrammatic view of the hydraulic system employed for raising the frame and showing the hydraulic system for the brakes;

FIG. 13 is a top plan view of another embodiment of the invention, showing the same in boat-carrying position;

FIG. 14 is a view similar to FIG. 13, but showing the vehicle in partly collapsed position;

FIGS. 15 and 16 are views looking in the direction of arrows 15 and 16, respectively, of FIG. 13;

FIG. 17 is a view looking in the direction of arrows 17 of FIG. 13, the sliding sleeve being shown in section;

FIG. 18 is a perspective view of the rear of the frame of the embodiments and a perspective view of a boat and dock therefor; and FIG. 19 is a view taken along line 19-19 of FIG. 18.

DESCRIPTION OF THE PREFERRED EMBODIMENTS

Referring more in detail to the drawings, the vehicle 20 includes a fork-type frame 22 including elongated, horizontally and rearwardly extending prongs 24 and 26. The front portions of the prongs merge forwardly and are joined at the front ends by a yoke 28. This yoke merges into a forwardly extending hitching section 30. A post 32 is threaded in the rear of the hitching section which, when rotated, raises or lowers the front end of the frame 22. A caster 34 carries the post 32.

Wheels 38 and 40 carry the remaining part of the frame 22 through two levers 42 and 44 and through fluid-actuated motors 46. Bearings 48 are welded to the underside of each prong 24 and 26, the axis thereof being aligned and disposed transversely of the elongated prongs. The levers 42 and 44 include portions 50 which are journaled in these bearings and they extend outwardly of the frame. The levers each include a rearwardly extending portion 52 which merges into a transversely extending axle 54 for one of the wheels 38 or 40. The axis of the bearings 48 and the axles 54 are parallel and are also horizontally disposed at right angles to a horizontal centerline of the elongated frame 22.

Circular flanges 58 are fixed to the portions 50 of the levers 42 and 44 to limit the inward movement of the levers. The inner ends of the portions 50 carry washers 60 which, together with pins 62 that extend vertically through the inner ends of the portions 50, limit the outward movement of the levers.

Flanges 66 are welded to the top sides of prongs 24 and 26 and these flanges extend outwardly of the prongs and directly above the levers 42 and 44. Hydraulic motors 68, each in the form of a cylinder 70 and ram 72, are interposed between the levers 42 and 44 and the flanges 66, the cylinders being pivotally connected with the flanges and the rams being pivotally connected with the levers. Thus, it is apparent that upon upward movement of the cylinders relative to the rams, the rear end of the frame 22 is raised relative to the ground wheels 38 and 40.

A motor-actuated pump or as herein shown (see FIG. 12), a hand pump 76 is connected with the hydraulic motors 68 by tubes 78 and 80. Suitable automatic brake control mechanism 82 is connected by tubes 84 and 86 to the brake drums 88 and 90 for the wheels 38 and 40.

A tie bar 94 (see FIGS. 5 and 6) is connected between the rear ends of prongs 24 and 26. Aligned, horizontally extending holes are formed in the rear ends of the prongs, and these holes receive the tie bar. The prongs are drilled vertically for receiving removable pins 96 which extend through holes in the tie bar. The tie bar can be removed readily after the pins 96 are removed.

Referring now to FIGS. 3 and 4, it will be seen that the prongs 24 and 26 are drilled vertically to receive vertically extending tubes 98 which are welded in place. These tubes receive screws 100 which are smaller in diameter than the inside diameter of the tubes 98. A nut 102 rests on the top of each tube 98 and is threaded onto the screw 100. By turning the nut, the screw can be either raised or lowered. The top of the screw merges into a ball joint 104 which carries a ball socket 106. A plate 108 is attached to the socket, and the top of the plate carries a pad 110. The pads, for example, carry a boat 112, and since the pads are mounted for oscillatory movement, they complement the contour of the underside of the boat.

The present invention, although not limited thereto, is particularly useful for moving, docking, launching and removing boats from docks and from afloat positions. When on the land, the boat is usually held off the ground by docks such as those shown at 114 in FIG. 19 and 114 and 116 in FIG. 18. When it is desired to remove the boat, the tie bar 94 is removed and then the vehicle 20, with the frame in its lowermost position, is backed under the boat, the prongs straddling the docks and the opposite sides of the longitudinal center of the boat. The tie bar is again attached to the prongs. The front end of the frame 22 is then elevated, by manipulating the threaded post 32, to approximately the final desired height. Thereafter, the hydraulic pump 76 is actuated to cause the raising of the cylinders 70 of the motors 68 to elevate the rear end of the frame 22. The several screws 100 are raised or lowered by the nuts 102 so that the pads complement the contour of the underside of the boat.

The reverse movements are carried out when lowering the boat on docks and removing the vehicle 20.

From the foregoing, it is readily apparent that by virtue of the present invention I have provided a simple in construction, inexpensive, stable and easily manipulated vehicle for hauling objects such as boats.

Referring to the embodiment shown in FIGS. 13 to 17, inclusive, the frame 122 is fork-shaped including two prongs 124 and 126. These prongs include, respectively, rearwardly extending portions 127 and 129 and forwardly extending, merging portions 131 and 133. The front end of prong portions 127 and 129 are each connected to the rear ends of the merging portions 131 and 133 by removable hinge pins 135 (see FIG. 16), which pins are held in place by cotter keys 137. The merged, i.e. front ends of the prong portions 131 and 133 are pivotally connected by a removable hinge pin 139 to a C-shaped bracket 141, which latter is fixed to a bar 130 through which the frame 122 is pushed and pulled. The pin 139 is held in position by a cotter key 143. This bar cooperates with elements like elements 32, 34 and 82 as shown in FIGS. 1 and 2.

When in operative position, the front ends of prongs 124 and 126 are held in that position by a brace 145 which can be rendered effective or ineffective. The brace is herein shown as the collapsible type including brackets 147 and 149 which are pivotally attached by bolts 151 to links 153 and 155, respectively. The free ends of the links are pivotally connected with one another by a pin 157 which is held in place by a cotter key 159. When in bracing position, the links are held in aligned position by a sleeve 161 which encircles the free ends of the links 153 and 155. This sleeve is held in link-aligning position by the pin 159, it being provided with aligned holes 163 for receiving the pin.

Further collapsing of the vehicle 120 can be effected by removing pins 135 to uncouple, respectively, prong portion 127 from prong portion 131 and prong portion 129 from prong portion 133. Also, the prong portions 131 and 133 can be uncoupled from the front bar 130 of the vehicle by withdrawing pin 139 from the bracket 141. Thus the front prong portions 131 and 133, together with the brace 145, can be stacked on or placed alongside the collapsed rear portion of the vehicle. Also, if desirable, the front portion including bar 130 can be stacked on or alongside the rear portion of the collapsed prongs of the vehicle.

From the foregoing, it is apparent that by the present invention I achieved the ready docking of a boat or the like, the ready lifting of the article from the dock, the ready launching of a boat and the ready removal of a boat out of the water in which it floats. Such result is achieved by providing a forklike frame, the space between the prongs of the frame being unobstructed. Upon docking of the boat from the vehicle, the vehicle with the boat thereon is backed, the prongs straddling the dock. Then upon lowering of the vehicle prongs, the boat will rest upon the dock. To remove the boat from the dock onto the vehicle, the vehicle is backed with the prongs straddling the dock. Thereafter, the prongs are raised, lifting the boat off the dock. The pads 110 are then adjusted to conform to the contour of the boat.

The boat can be readily launched by backing the vehicle with the boat thereon into the water. Then the prongs are lowered, whereby the boat is floated. The vehicle is then withdrawn from the water. In removing the boat from the water, the vehicle is backed into the water with the prongs straddling the longitudinal center of the boat. Thereafter, the prongs are raised to at least partly lift the boat from its full floating position. Then the vehicle with the boat thereon is removed from the water.

I claim:

1. A vehicle for moving boats or the like, said vehicle comprising in combination:
   A. a frame comprising:
      1. a fork for supporting a boat, said fork including:
         a. two rearwardly extending and laterally disposed prongs, the front portions of the prongs merging forwardly;
         b. means joining the merged portions of the prongs to form said fork;
      2. a removable tie bar connecting the rear portions of the prongs; and
      3. means disposed along each prong for providing supports for a boat having portions at a lower level than the prongs;
   B. a bearing carried by one of the prongs intermediate the ends of said prong, the axis of the bearing being disposed transversely of the prong;
   C. a lever journaled in the bearing, said lever including:
      1. an axle extending outwardly of the said prong, the axis of the axle being disposed transversely of the said prong;
   D. a wheel journaled on the outwardly extending axle;
   E. means connected with the said one prong and the lever for raising and lowering the bearing relative to the first-mentioned axle;
   F. a second bearing carried by the other prong intermediate the ends of the latter prong, the axis of the second-mentioned bearing being disposed transversely of the second-mentioned prong;
   G. a lever journaled in the second-mentioned bearing, said latter lever including:
      1. an axle extending outwardly of the second-mentioned prong, the axis of the latter axle being disposed transversely of the latter-mentioned prong;
   H. a wheel journaled on the latter outwardly extending axle;
   I. means connected with the second-mentioned prong and the second-mentioned lever for raising and lowering the second-mentioned bearing relative to the second-mentioned axle.

2. A vehicle as defined in claim 1, characterized in that the means (E) includes motors of the fluid type connected, respectively, between the levers and the prongs.

3. A vehicle as defined in claim 2, characterized to include a pump carried by the frame and connected with the motors.

4. A vehicle as defined in claim 1, characterized in that the rear end of one of the front merging portions of one of the prongs is separable from the rear portion of that prong, and further characterized to include:
   1. removable means pivotally connecting said separable portion from the rear portion of that prong;
   2. a brace at the front section of the fork interconnecting said prongs;
   3. means for rendering the brace ineffective as such.

5. A vehicle as defined in claim 4, characterized in that the brace is collapsible for rendering the same ineffective.

6. A vehicle as defined in claim 4, characterized in that the rear end of the other prong is also separable at its rear portion from the remaining portion of said other prong, and further characterized to include removable means pivotally connecting said other separable portion to the remaining portion of said other prong.

7. A vehicle as defined in claim 6, characterized in that the brace is collapsible for rendering the same ineffective.

8. comprising vehicle for moving boats or the like, said vehicle comprising in combination:
A. a fork type frame including:
1. two rearwardly extending and laterally disposed prongs, the front portions of the prongs merging forwardly;
2. means joining the merged portions of the prongs to form said fork;
3. a tie bar;
4. means for removably connecting the tie bar to the rear portions of the prongs, the area between the prongs rearwardly of the merging portions of the prongs being unobstructed when the tie bar is removed;
5. means disposed along each prong for providing supports for a boat;
B. a bearing carried by one of the prongs intermediate the ends of said prong, the axis of the bearing being disposed transversely of the prong;
C. a lever journaled in the bearing, said lever including:
1. an axle extending outwardly of the said prong, the axis of the axle being disposed transversely of the said prong;
D. a wheel journaled on the outwardly extending axle;
E. means connected with said one prong and the lever for raising and lowering the bearing relative to the first-mentioned axle;
F. a second bearing carried by the other prong intermediate the ends of the latter prong, the axis of the second-mentioned bearing being disposed transversely of the second-mentioned prong;
G. a lever journaled in the second mentioned bearing, said latter lever including:
1. an axle extending outwardly of the second-mentioned prong, the axis of the latter axle being disposed transversely of the latter-mentioned prong;
H. a wheel journaled on the latter outwardly extending axle;
I. means connected with the second-mentioned prong and the second-mentioned lever for raising and lowering the second-mentioned bearing relative to the second-mentioned axle.

9. A vehicle as defined in claim 8, characterized in that the rear end of one of the front merging portions of one of the prongs is separable from the rear portion of that prong, and further characterized to include:
1. removable means pivotally connecting said separable portion from the rear portion of that prong;
2. a brace at the front section of the fork interconnecting said prongs;
3. means for rendering the brace ineffective as such.

10. A vehicle as defined in claim 9, characterized in that the rear end of the other prong is also separable at its rear portion from the remaining portion of said other prong, and further characterized to include removable means pivotally connecting said other separable portion to the remaining portion of said other prong.

11. A vehicle as defined in claim 9, characterized in that the brace is collapsible for rendering the same ineffective.

12. A vehicle as defined in claim 11, characterized in that the brace is collapsible for rendering the same ineffective.